United States Patent
Yoneda et al.

(10) Patent No.: US 6,960,861 B2
(45) Date of Patent: Nov. 1, 2005

(54) COMBINED STATOR CORE FOR AN ELECTRIC ROTARY MACHINE

(75) Inventors: Shigenori Yoneda, Oobu (JP); Masahiro Seguchi, Oobu (JP); Noriyasu Inomata, Toyota (JP)

(73) Assignee: Denso Corporation, Kariya (JP)

( * ) Notice: Subject to any disclaimer, the term of this patent is extended or adjusted under 35 U.S.C. 154(b) by 1 day.

(21) Appl. No.: 10/721,166

(22) Filed: Nov. 26, 2003

(65) Prior Publication Data

US 2004/0104638 A1    Jun. 3, 2004

(30) Foreign Application Priority Data

Nov. 29, 2002 (JP) ............................. 2002-348453
Oct. 14, 2003 (JP) ............................. 2003-354258

(51) Int. Cl.⁷ ............................................. H02K 1/00
(52) U.S. Cl. ...................... 310/216; 310/217; 310/259
(58) Field of Search ............................... 310/216–218, 310/254, 258, 259

(56) References Cited

U.S. PATENT DOCUMENTS

| | | | | |
|---|---|---|---|---|
| 607,609 A | * | 7/1898 | Short ........................ | 310/218 |
| 893,711 A | * | 7/1908 | Cushman .................... | 310/254 |
| 1,538,196 A | * | 5/1925 | Livingston .................. | 310/259 |
| 1,922,216 A | | 8/1933 | Persons ...................... | 310/217 |
| 2,278,139 A | | 3/1942 | Puchy ......................... | 310/254 |
| 2,323,114 A | * | 6/1943 | Werner et al. .............. | 310/218 |
| 2,607,816 A | * | 8/1952 | Ryder et al. ................. | 310/42 |
| 2,709,762 A | * | 5/1955 | Naul ........................... | 310/172 |
| 4,071,793 A | * | 1/1978 | Cox ............................ | 310/71 |
| 5,223,761 A | * | 6/1993 | Larsen ........................ | 310/259 |
| 5,570,503 A | * | 11/1996 | Stokes ........................ | 29/596 |
| 5,894,182 A | * | 4/1999 | Saban et al. ................ | 310/217 |

FOREIGN PATENT DOCUMENTS

| | | |
|---|---|---|
| JP | A 60-261336 | 12/1985 |
| JP | A 61-124241 | 6/1986 |
| JP | U 05-11754 | 2/1993 |
| JP | A 07-067272 | 3/1995 |
| JP | A 2000-184630 | 6/2000 |
| WO | WO 00/72426 | 11/2000 |

* cited by examiner

*Primary Examiner*—Dang Le
(74) *Attorney, Agent, or Firm*—Oliff & Berridge, PLC

(57) ABSTRACT

A yoke includes a plurality of recessed portions. A teeth block includes a plurality of protruding portions being coupled or fitted into the recessed portions of the yoke. The recessed portions and the protruding portions are disposed as a plurality of pairs in the lamination direction. The protruding portions and the yoke are fixed with a teeth fixing pin.

20 Claims, 16 Drawing Sheets

$1.0 < Rx/Ry < 1.5$

COMBINED STATOR CORE FOR AN ELECTRIC ROTARY MACHINE

BACKGROUND OF THE INVENTION

This invention relates to a combination type stator core constituted by multilayered electromagnetic steel plates and employed in an electric rotary machine.

The Japanese Patent Application Laid-open No. 61-124241(1986) or the Japanese Utility Model Laid-open No. 5-11754(1993) discloses a combined stator core including a plurality of separate electromagnetic steel plate members combined into a multilayered structure. The Japanese Patent Application Laid-open No. 61-124241(1986) discloses an axial coupling type combined stator core including a cylindrical yoke having numerous recessed portions (i.e., groove portions) arranged at predetermined pitches in the circumferential direction and opened toward one end in the radial direction and teeth having protruding portions engaged or fitted into the recessed portions of the yoke in the axial direction.

The Japanese Utility Model Laid-open No. 5-11754 (1993) discloses a radial coupling type combined stator core including a cylindrical yoke having numerous recessed portions arranged at predetermined pitches in the circumferential direction and opened toward the inner radial direction and teeth having protruding portions engaged or fitted into the recessed portions of the yoke in the radial direction.

The axial coupling type combined stator core disclosed in the above-described Japanese Patent Application Laid-open No. 61-124241(1986) is easy to manufacture and is advantageous in preventing the teeth from being pulled out in the radial directions. However, as the yoke and teeth are constituted by electromagnetic steel plates being multilayered, the surfaces of the recessed portions and the protruding portions formed on the yoke and teeth remain uneven or undulated. If required to reduce the gap formed between the recessed portions and the protruding portions when the yoke and teeth are engaged or fitted, constituting the yoke and teeth with the electromagnetic steel plates being multilayered will become difficult.

On the other hand, the above-described radial coupling type combined stator core disclosed in the Japanese Utility Model Laid-open No. 5-11754(1993) can solve the problem of the above-described axial coupling type combined stator core. However, the radial coupling type combined stator core is inferior to the axial coupling type combined stator core in that the circumferential width of each recessed portion cannot be reduced so much at its opening end. Thus, there is a problem that the teeth may be pulled out the yoke in the radial direction due to magnetic vibrations. Not only the combined stator cores disclosed in the Japanese Patent Application Laid-open No. 61-124241(1986) and the Japanese Utility Model Laid-open No. 5-11754(1993) but also many of other conventional combined stator cores have a problem in that it is difficult to eliminate the gap (or clearance) between the teeth and yoke formed when they are faced with each other. Accordingly, when electric power is supplied to a stator coil, the magnetic vibrations caused by the stator core induce chattering vibrations in the teeth and accordingly generate noises. Furthermore, the magnetic resistance in the above-described gap is so large that the efficiency of the electric rotary machine decreases significantly.

SUMMARY OF THE INVENTION

In view of the above-described problems, the present invention has an object to provide a combination type stator core for an electric rotary machine which has a simplified arrangement capable of preventing each teeth block from falling off the yoke and also capable of reducing the noises generated from the teeth block when the teeth block cause tiny vibrations.

It is generally known that the combined stator core is advantageous in that the winding work for the stator coil, especially the concentrated winding work, is simple.

In order to accomplish the above and other related objects, the present invention provides a first combination type stator core applicable to an electric rotary machine which is composed of a plurality of electromagnetic steel plates being multilayered so as to have a cylindrical yoke with numerous recessed portions arranged at predetermined pitches in the circumferential direction and each opened toward an inner radial direction and a teeth block extending toward the inner radial direction with protruding portions coupled or fitted into the recessed portions of the yoke. One or more teeth fixing pins are provided to fix the teeth block to the yoke. The yoke includes first annular plates defining the recessed portions being opened toward both axial directions as well as toward the inner radial direction and second annular plates being disposed next to the first annular plates at axial end thereof and each having a shielding plate portion for shielding the recessed portions of the first annular plates in a lamination direction of the multilayered electromagnetic steel plates. Each teeth block includes first teeth defining the protruding portions inserted in the radial direction and fitted into the recessed portions and second teeth disposed next to the first teeth in the axial direction so as to be brought into hermetical contact with a cylindrical surface of the second annular plate. And, the teeth fixing pin is inserted in through-holes of the shielding plate portions of the second annular plates and through-holes of the protruding portions of the second teeth which are overlapped with each other in the lamination direction.

According to this arrangement, the protruding portions and the second annular plates are fixed with each other by means of the teeth fixing pin. Thus, the present invention can assure adequate hermetical contact between each teeth block and the yoke which is the advantage of the radial coupling type combined stator core not realized by the axial coupling type combined stator core. Furthermore, the present invention can solve the drawbacks of the above-described conventional radial coupling type combined stator core. More specifically, the present invention makes it possible to prevent each teeth block from falling off the yoke in the radial direction and suppress the chattering vibrations of the teeth block. Thus, it becomes possible to realize a practically excellent combined stator core. The teeth fixing pin of this invention is, for example, a bolt and preferably a press-fit pin.

Furthermore, the present invention provides a second combination type stator core applicable to an electric rotary machine which is composed of a plurality of electromagnetic steel plates being multilayered so as to have a cylindrical yoke with numerous recessed portions arranged at predetermined pitches in the circumferential direction and each opened toward an inner radial direction and a teeth block extending toward the inner radial direction with protruding portions coupled or fitted into the recessed portions of the yoke. The yoke includes first annular plates defining the recessed portions being opened toward both axial directions as well as toward the inner radial direction and second annular plates being disposed next to the first annular plates at axial end thereof and each having a shielding plate portion for shielding the recessed portions of the first annular plates in a lamination direction of the multilayered electromagnetic steel plates. The teeth block includes first teeth defining the protruding portions inserted in the radial direction and fitted into the recessed portions and second teeth each being disposed next to the first teeth in the axial direction so as to be brought into hermetical contact with a cylindrical surface of the second annular plate. And, the recessed portions and the protruding portions being fitted into the recessed portions are provided as a plurality of pairs and disposed in such a manner that the recessed portions are independent from each other in the lamination direction and also the protruding portions are independent from each other in the lamination direction.

Namely, according to the second combination type stator core, each teeth block has a plurality of protruding portions independent from each other in the lamination direction. Each protruding portion is coupled or fitted into a corresponding recessed portion. Thus, compared with the conventional radial coupling type combined stator core, the present invention can provide an improved connection between the teeth block and the yoke.

Furthermore, according to a preferred embodiment of the present invention, it is possible to remarkably reduce the magnetic resistance of the stator core.

Hereinafter, the effects of the present invention will be explained in more detail with reference to FIGS. 1 to 4.

FIGS. 1 and 2 are cross-sectional views each showing a combined stator core taken along a plane extending in the circumferential direction. There is a gap 'g' between a first annular plate 11 of a yoke 1 and a protruding portion 210 of a first tooth 21 of a teeth block 2. The gap g extends in the circumferential direction as well as in the radial direction (although not shown). The presence of gap g is one of the causes that the magnetic resistance of the stator core is increased.

FIG. 1 shows a condition that the amount of magnetic flux is small. In this case, the magnetic flux first flows in the radial direction from the teeth block 2 to the protruding portion 210 of each first tooth 21. Subsequently, the magnetic flux flows in the lamination direction toward the second annular plate 12 from the protruding portion 210. Meanwhile, the magnetic flux flowing in the lamination direction from the second annular plate 12 to the protruding portion 210 can subsequently flow from the protruding portion 210 to the teeth block 2 in the radial direction. Thus, almost all of the magnetic fluxes can substantially make a detour to avoid the gap g. More specifically, a magnetic path cross section at the gap g is fairly small compared with a magnetic path cross section intervening between the protruding portion 210 and the second annular plate 12. Thus, the magnetic flux can easily make a detour to avoid the gap g when flowing from the protruding portion 210 to the second annular plate 12 or oppositely from the second annular plate 12 to the protruding portion 210.

FIG. 2 shows another condition that the magnetic flux is so increased that the second annular plate 12 is almost in the magnetic saturation. In this case, if the magnetic flux flows in the above-described path shown in FIG. 1, the second annular plate 12 will immediately reach the magnetic saturation. Hence, the magnetic flux entering into or exiting from the protruding portion 210 is forced to directly flow into the first annular plate 11 via the gap g and the magnetic flux of the first annular plate 11 directly flows into the protruding portion 210 via the gap g.

FIGS. 3 and 4 are cross-sectional views each showing the combined stator core taken along a plane extending in the axial direction. There is a gap g' between the second annular plate 12 of the yoke 1 and a second tooth 22 of the teeth block 2. The gap g' extends in the radial direction as well as in the circumferential direction (although not shown). The presence of gap g' is one of the causes that the magnetic resistance of the stator core is increased.

FIG. 3 shows a condition that the amount of magnetic flux is small. In this case, the magnetic flux first flows from the rotor to each second tooth 22 of the teeth block 2 and subsequently flows from the second tooth 22 to the first tooth 21. Then, the magnetic flux flows from the protruding portion 210 of the first tooth 21 to the second annular plate 12. On the other hand, the magnetic flux of the second annular plate 12 flows into the first tooth 21 via the protruding portion 210. Thus, the magnetic fluxes can substantially make a detour to avoid the gap g'.

FIG. 4 shows another condition that the magnetic flux is so increased that the first annular plate 12 is almost in the magnetic saturation. In this case, if the magnetic flux flows in the above-described path shown in FIG. 3, the first annular plate 11 will immediately reach the magnetic saturation. Hence, the magnetic flux entering into or exiting from each second tooth 22 is forced to directly flow into the second annular plate 12 via the gap g' and the magnetic flux of the second annular plate 12 directly flows into the second tooth 22.

As apparent from the foregoing, the radial coupling type combined stator core has a magnetic path allowing the magnetic flux to make a detour to avoid the gap g or g' when the amount of magnetic flux is small. Thus, the magnetic resistance can be suppressed to a lower level. However, the above-described conventional stator core relies on a single protruding portion. Hence, to make a detour to avoid the above-described gap g or g', the magnetic flux is forced to flow in the lamination direction of the multilayered electromagnetic steel plates cooperatively constituting the protruding portions 210, the first annular plates 11, the second annular plates 12, and each of the first tooth 21 and the second tooth 22. In other words, the magnetic flux repetitively crosses the gap (i.e., the tiny clearance intervening between adjacent electromagnetic steel plates) when it flows between the electromagnetic steel plate being multilayered. When summed up, such tiny clearances are not negligible. Hence, crossing the tiny clearances so many times will be equivalent for the magnetic flux to pass a significantly large gap. As a result, the magnetic resistance of the detour route will be increased.

On the other hand, this invention employs a unique teeth coupling structure according to which a plurality of protruding portions disposed in the lamination direction are coupled or fitted independently into a plurality of recessed portions. Accordingly, this invention brings the effect of reducing the number of gaps intervening between the multilayered electromagnetic steel plates which are necessary for the magnetic flux to pass to make a detour to avoid the gap g or g' in the above-described condition that the amount of magnetic flux is small. Furthermore, the present invention makes it possible to substantially increase the magnetic path cross section perpendicular to an equivalent gap detour route. As a result, the magnetic resistance of this detour route can be reduced greatly. This brings the effect of greatly suppressing the increase of iron loss which is the largest problem in the conventional combined stator cores.

By the way, the duration of operation of the electric rotary machine driven under a mode such that the electromagnetic steel plates substantially reach the magnetic saturation and accordingly the magnetic flux is forced to directly flow across the above-described gap is relatively short. Furthermore, the present invention can enhance the mechanical fixing strength of the teeth block and the yoke and also increase the frictional force acting therebetween, as the effects brought by the above-described unique coupling arrangement of the plural recessed portions and the corresponding protruding portions disposed in the lamination direction. It becomes possible to suppress the magnetic vibrations caused in the teeth block when a.c. current is supplied to the stator coil. Furthermore, the magnetic noises can be reduced. In this respect, the present invention brings great advantages in practice.

Preferably, the recessed portions and the protruding portions being fitted into the recessed provided as a plurality of pairs and disposed in such a manner that the recessed portions are independent from each other in the lamination direction and also the protruding portions are independent from each other in the lamination direction. With this arrangement, the effects of the above-described two aspects of the present invention can be realized simultaneously.

Preferably, a circumferential width of a radial end portion of the protruding portion is 98% or more of a circumferential width of a radial opening portion of the recessed portion. With this arrangement, it becomes possible to reduce the magnetic resistance and also suppress undesirable dislocation of the teeth block relative to the yoke or eliminate the looseness in the engagement of the teeth block and the yoke.

Preferably, the circumferential width of the protruding portion continuously increases with increasing distance from the radial end portion in the inner radial direction, and the circumferential width of the recessed portion continuously decreases with increasing distance from the radial opening portion toward an outer radial direction. With this arrangement, each protruding portion can be smoothly guided by a corresponding recessed portion so as to ensure the positioning of them in the circumferential direction. Thus, it becomes possible to easily accomplish the coupling between the protruding portion and the recessed portion. Furthermore, this arrangement brings the effect of greatly reducing the gap between the protruding portion and the corresponding recessed portion when they are engaged or assembled together.

Preferably, an end portion of the teeth fixing pin is flattened by plastic deformation after the teeth fixing pin is inserted into the through-holes. With this arrangement, it becomes possible to easily produce a pressing force required when the protruding portion is pushed toward the second annular plate (especially, its shielding plate portion) in the lamination direction. This automatically solves the problem of a bolt when used as a fixing member which may be loosened when subjected to magnetic vibrations.

Preferably, the first annular plates and the second annular plates are welded together, and the first teeth and the second teeth are welded together. With this arrangement, it becomes possible to suppress relative vibrations between the first annular plates and the second annular plates as well as relative vibrations between the first teeth and the second teeth, thereby reducing the magnetic vibrations. Furthermore, it becomes possible to enhance the mechanical strength of the yoke or the teeth block.

Preferably, the welded portion of the first teeth and the second teeth is offset from the teeth fixing pin by a predetermined distance in the radial direction and is located at the same position in the circumferential direction. With this arrangement, it becomes possible to enhance the mechanical connecting strength of the teeth block. Furthermore, most of the magnetic flux flowing in the teeth block is directed to the radial direction. Thus, locating the teeth fixing pin and the welded portion at the same position in the circumferential direction is effective in reducing the current induced in a short-circuit path formed by the teeth fixing pin, the welded portion, and the electromagnetic steel plates.

Preferably, punch-out portions extending in the lamination direction and being continuous with each other are formed in the first annular plates and the second annular plates or in the first teeth and the second teeth. The work for positioning the teeth block relative the yoke in laminating the electromagnetic steel plates becomes simple and can be carried out accurately. Furthermore, it becomes possible to easily prevent or eliminate the relative displacement between the first teeth and the second teeth as well as the relative displacement between the first annular plates and the second annular plates.

Preferably, a terminal base for processing a coil end is fixed to one end surface of the yoke by means of the teeth fixing pin. The stator core can be simplified in structure.

Preferably, the first annular plates, the second annular plates, the first teeth, and the second teeth are constituted by a plurality of electromagnetic steel plates being multilayered. With this arrangement, it becomes possible to reduce the number of coupling pairs of the recessed portion and the protruding portion located next to each other in the lamination direction. Thus, the coupling work can be simplified.

Preferably, the teeth fixing pin is a plurality of pins spaced in the radial direction by a predetermined distance and located at the same position in the circumferential direction. With this arrangement, it becomes possible to enhance the mechanical connecting strength of the teeth block. The magnetic excitation force applied on a radial directional cross section of the teeth block can be reduced. The vibration of the teeth block caused by the reaction of the motor torque can be reduced, too. Furthermore, most of the magnetic flux flowing in the teeth block is directed to the radial direction. Thus, locating (or overlapping) the plurality of teeth fixing pins at the same position in the circumferential direction is effective in reducing the current induced in a short-circuit path formed by the plurality of teeth fixing pins and the electromagnetic steel plates.

Preferably, a first tooth or a second tooth is connected to other first tooth or other second tooth neighboring in the circumferential direction via an overhanging flange which extends from an inner end of the first tooth or the second tooth so as to close a slot. With this arrangement, the number of the first teeth or second teeth connectable in the circumferential direction can be increased under the condition that these teeth are inserted into the inner cylindrical portion of the yoke. Thus, the anti-vibration strength of the teeth block can be increased.

Preferably, the protruding portions and the recessed portions are constituted by a plurality of electromagnetic steel plates being multilayered. With this arrangement, each protruding portion becomes thick in the axial direction so that the bending durability in the axial direction can be enhanced. With this arrangement, when the protruding portion is inserted into a corresponding recessed portion, the protruding portion is prevented from being bent in the axial direction and being offset or deviated from a target position in the axial insertion. Especially, this arrangement brings remarkable effects in the case that numerous protruding portions are disposed at predetermined intervals in the circumferential direction. Namely, this arrangement prevents respective protruding portions from being dislocated in the axial direction. Thus, all of the protruding portions can be surely inserted into corresponding recessed portions. Regarding the electromagnetic steel plates constituting the yoke, it is possible to bond and integrate them at an appropriate timing prior to insertion of the teeth block into the yoke. Similarly, it is possible to bond and integrate the teeth at an appropriate timing prior to insertion of the teeth block into the yoke.

Preferably, the yoke includes a plurality of recessed portions being overlapped at predetermined intervals in the axial direction. The teeth block includes a plurality of protruding portions being overlapped at predetermined intervals in the axial direction and being respectively inserted into the recessed portions of the yoke. And, a ratio of a total width of the protruding portions in the axial direction to a total width of the recessed portions in the axial direction is in a range from 0.8 to 1.2. With this arrangement, it becomes possible to reduce the axial gap between the recessed portion and the protruding portion and accordingly reduce the magnetic resistance. Furthermore, it becomes possible to increase a facing area between the protruding portion and the recessed portion and accordingly reduce the magnetic resistance.

Preferably, the recessed portion and the protruding portion being inserted into the recessed portion are configured into rectangular shape when seen from the axial direction. A convex corner of the protruding portion and a concave corner of the recessed portion being fitted to each other are chamfered. And, a ratio Rx/Ry is in a range from 1.0 to 1.5, where Rx represents a curvature radius of the convex corner of the protruding portion and Ry represents a curvature radius of the concave corner of the recessed portion. With this arrangement, when the protruding portion is inserted into the recessed portion, the convex corner of the protruding portion smoothly guides the insertion of the protruding portion. Furthermore, this arrangement brings the effect of reducing an average clearance between the convex corner of the protruding portion and the concave corner of the recessed portion in the radial direction in the condition that the protruding portion is inserted into the recessed portion.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Preferred embodiments of the combination type stator core applicable to electric rotary machines will be explained hereinafter with reference to attached drawings.

First Embodiment

Figure 1:
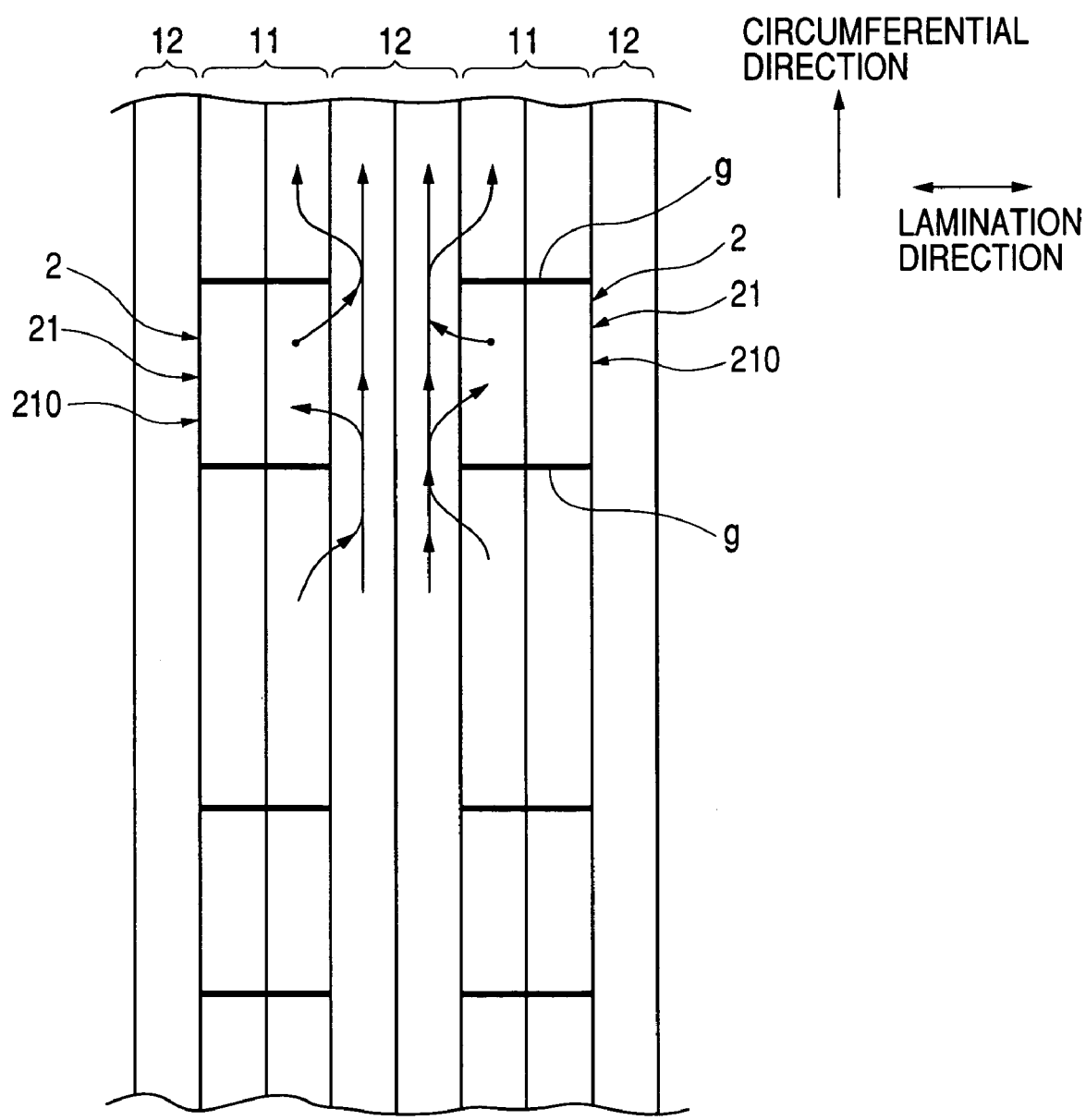
FIG. 1 is a view explaining small-amount magnetic flux flowing in the circumferential direction.
Figure 2:
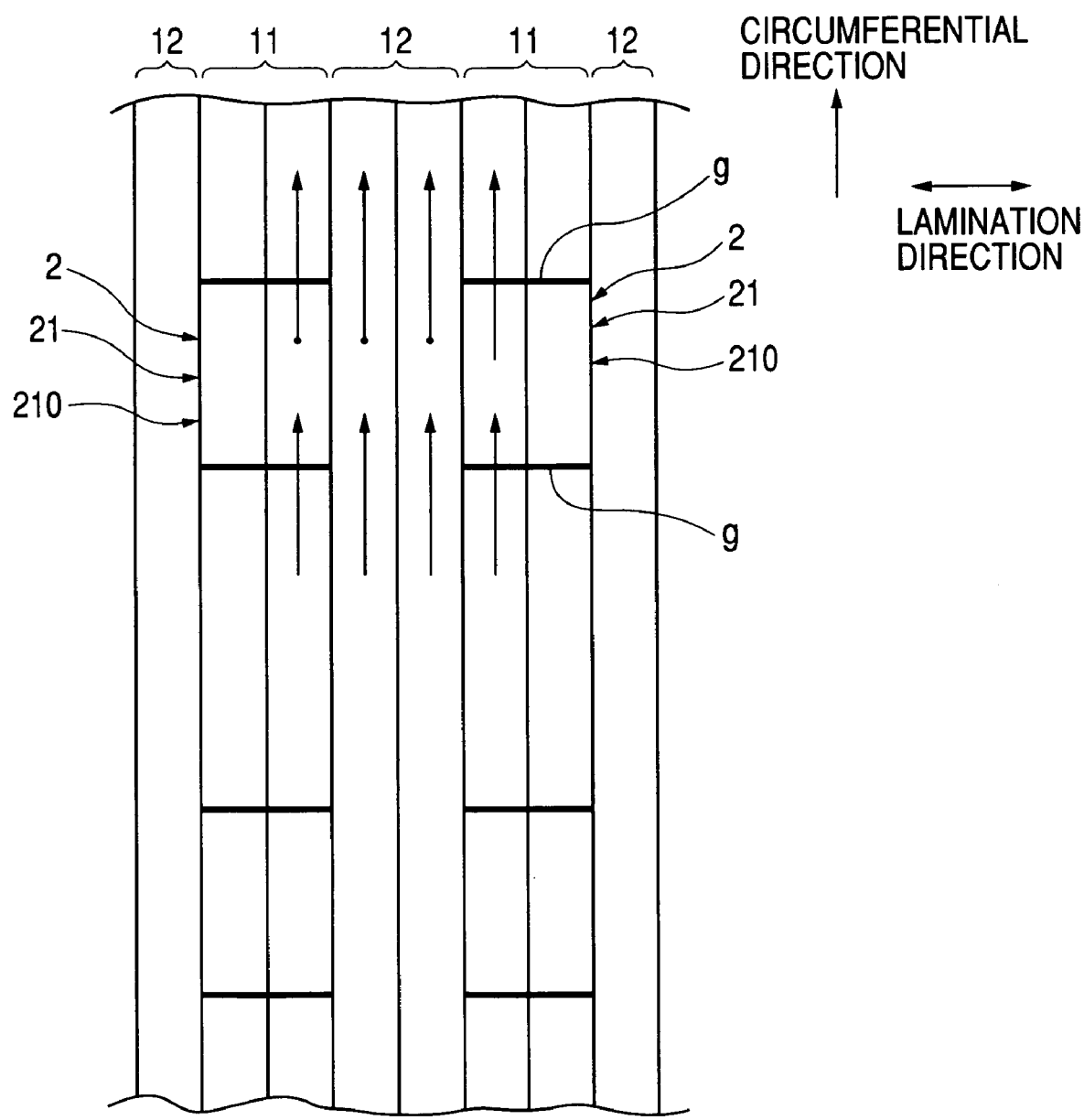
FIG. 2 is a view explaining small-amount magnetic flux flowing in the radial direction.
Figure 3:
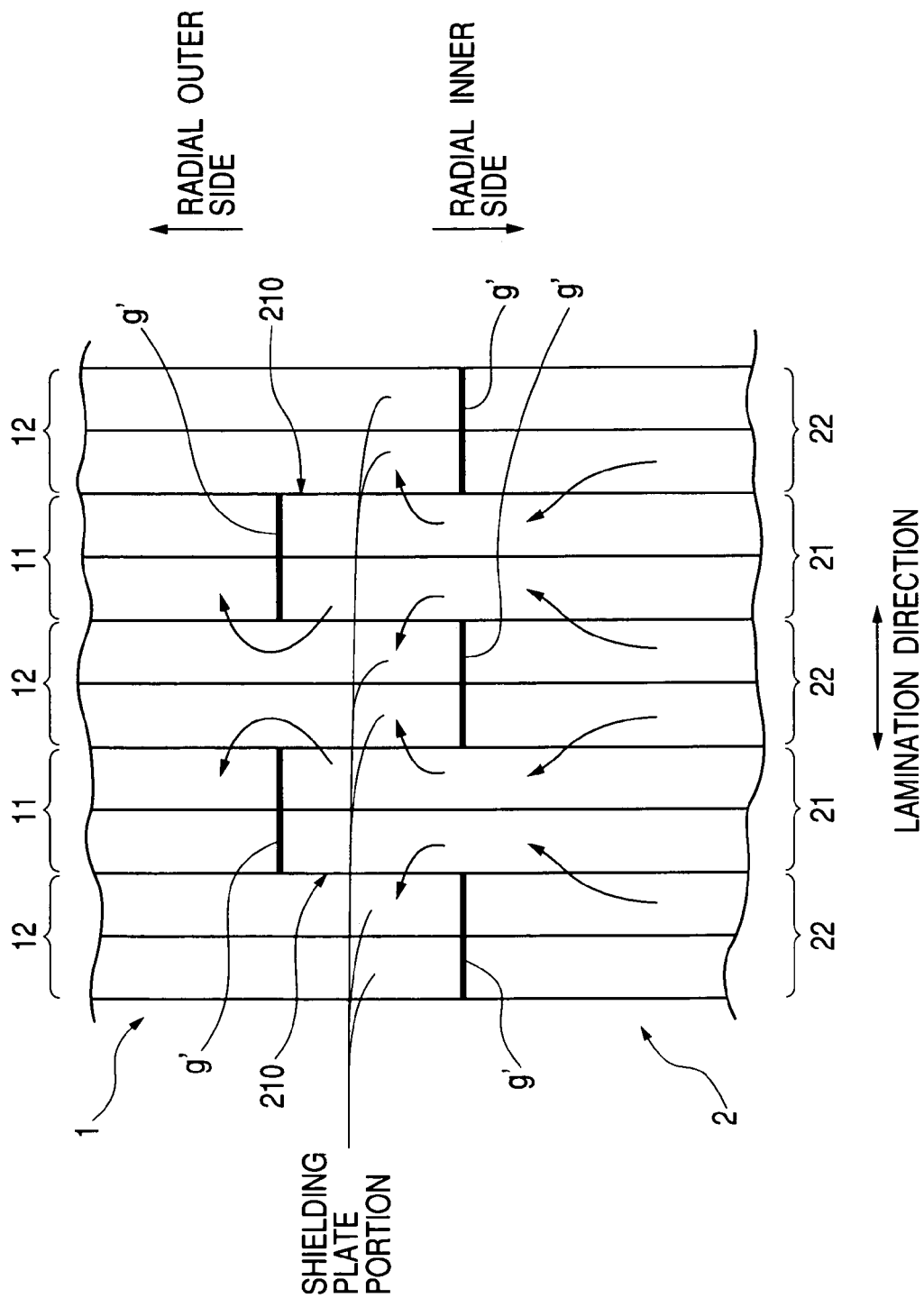
FIG. 3 is a view explaining large-amount magnetic flux flowing in the circumferential direction.
Figure 4:
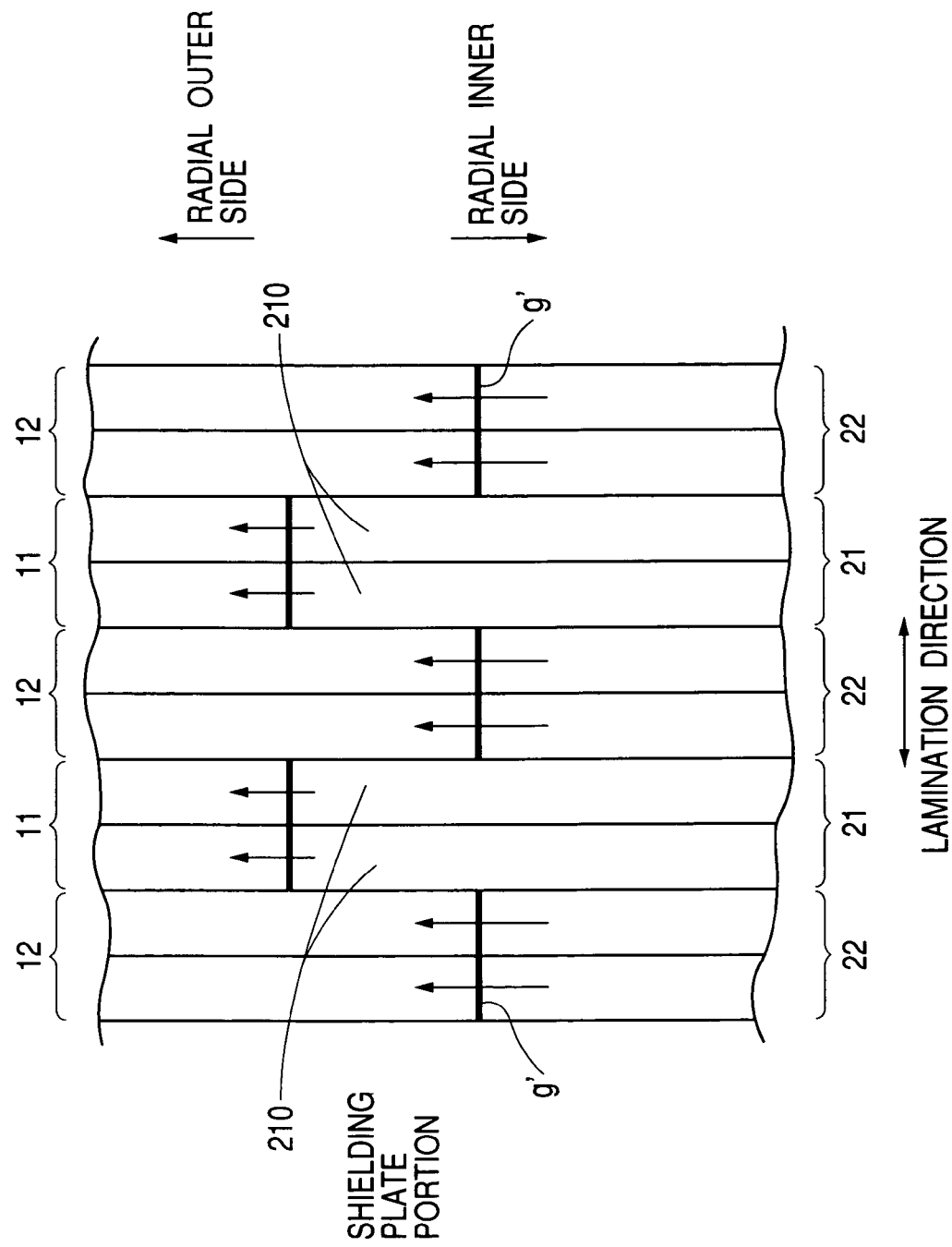
FIG. 4 is a view explaining large-amount magnetic flux flowing in the radial direction.
Figure 5:
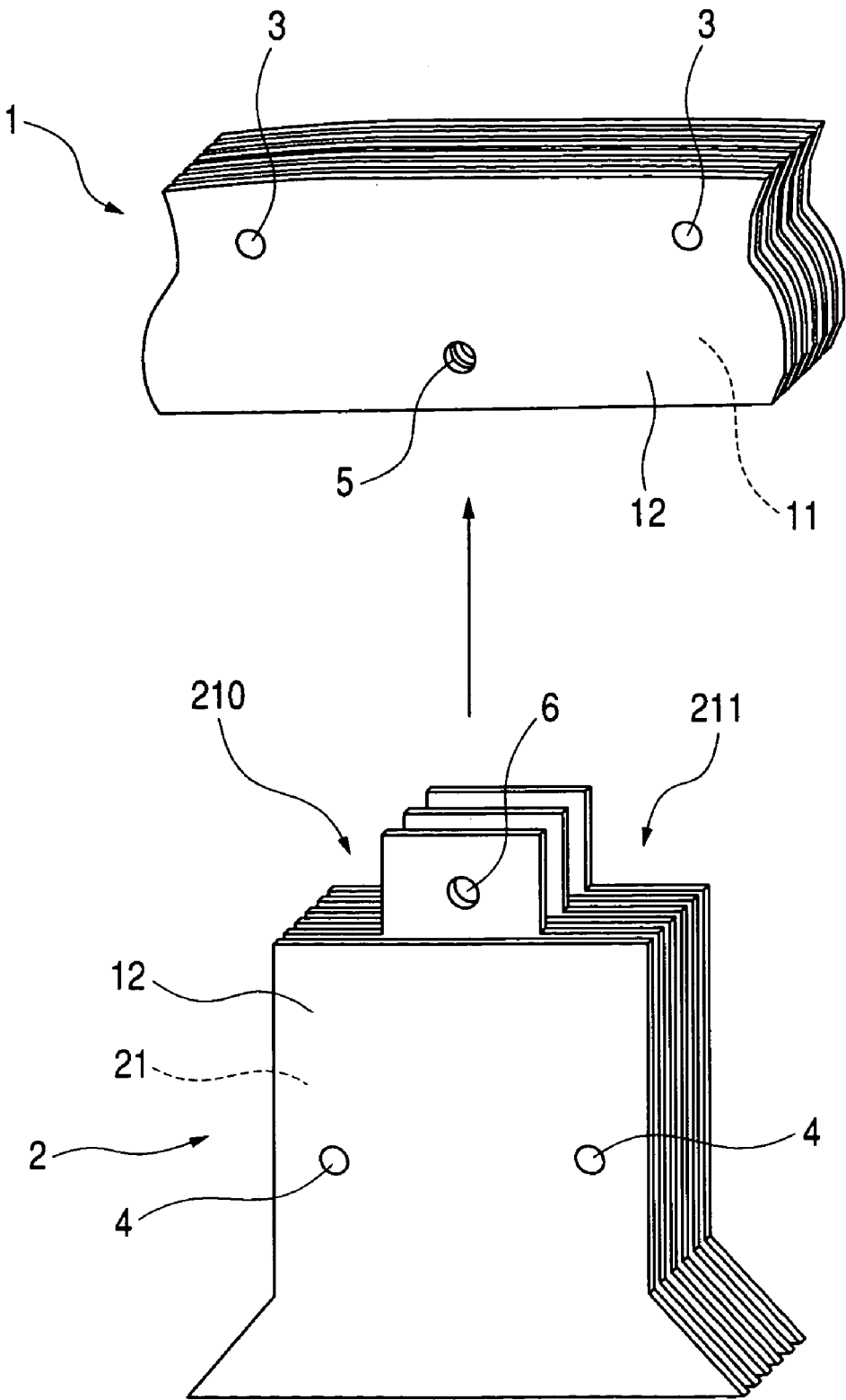
FIG. 5 is a view explaining a partial perspective view showing a yoke and a teeth block in accordance with a first embodiment of the present invention.
Figure 6:
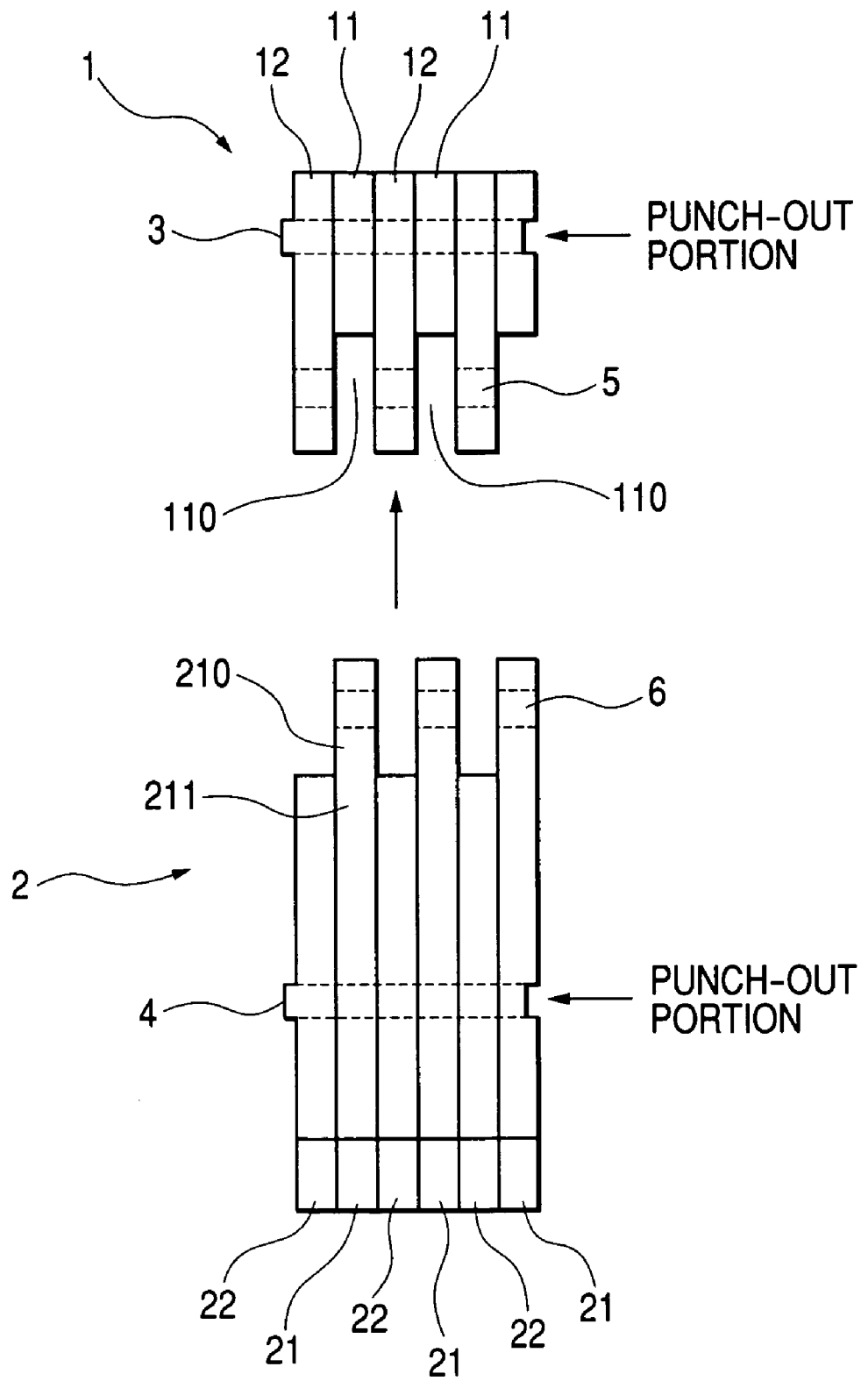
FIG. 6 is a partial cross-sectional view showing the yoke and the teeth block shown in FIG. 5, seen in the axial direction (i.e., lamination direction)

A combined stator core according to a first embodiment of the present invention will be explained hereinafter with reference to FIGS. 5 and 6. A combined stator core includes a cylindrical yoke 1 and a plurality of teeth block 2 coupled or fitted into an inner cylindrical surface of the yoke 1 at predetermined pitches in the circumferential direction. FIG. 5 is a partial perspective view showing a part of the yoke 1 and a single teeth block 2. FIG. 6 is a partial cross-sectional view showing the yoke 1 and the teeth block 2 shown in FIG. 5, taken along the axial direction (i.e., lamination direction).

The yoke 1 includes first annular plates 11 and second annular plates 12 which are alternately laminated so as to form a multilayered body. Each of the first annular plates 11 and the second annular plates 12 is made of a single disk-like electromagnetic steel plate. The teeth block 2 includes first teeth 21 and second teeth 22 which are alternately laminated so as to form a multilayered body. Each of the first teeth 21 and the second teeth 22 is made of a single disk-like electromagnetic steel plate.

In the teeth block 2, each of the first teeth 21 consists of a base portion 211 and a protruding portion 210 which are integrally formed. The base portion 211 has a shape defining a fundamental cross-sectional shape of the teeth block 2 taken along a plane normal to the axial direction. The protruding portion 210 is positioned at the outermost end of the base portion 211 in the radial direction. The base portion 211 has an outer edge portion 212 which is brought into hermetical contact with an inner cylindrical surface of the first annular plate 11. The protruding portion 210 protrudes outward in the radial direction from the outer edge portion 212 of the base portion 211. Each of the second teeth 22 has no protruding portion corresponding to the protruding portion 210. In other words, each of the second teeth 22 has a shape identical with the base portion 211 of the first teeth 21 which defines the fundamental cross-sectional shape of the teeth block 2 taken along a plane normal to the axial direction. The protruding portion 210, as apparent from FIG. 5, is positioned at substantially the center of the base portion 211 of each first tooth 21 in the circumferential direction. The protruding portion 210 is rectangular.

In the yoke 1, each of the first annular plates 11 includes a recessed portion 110 having a shape substantially identical with that of the protruding portion 210 of the first tooth 21. When the protruding portion 210 is coupled or fitted into the recessed portion 110, the shape of the stator core is completed. Each of the second annular plates 12 has no recessed portion corresponding to the recessed portion 110 of the first annular plate 11. In other words, each of the second annular plates 12 has an inner cylindrical surface on which no protruding or recessed portions are formed. In the first annular plate 11, a portion adjacent to the recessed portion 110 is referred to as a shielding plate portion.

Figure 7:
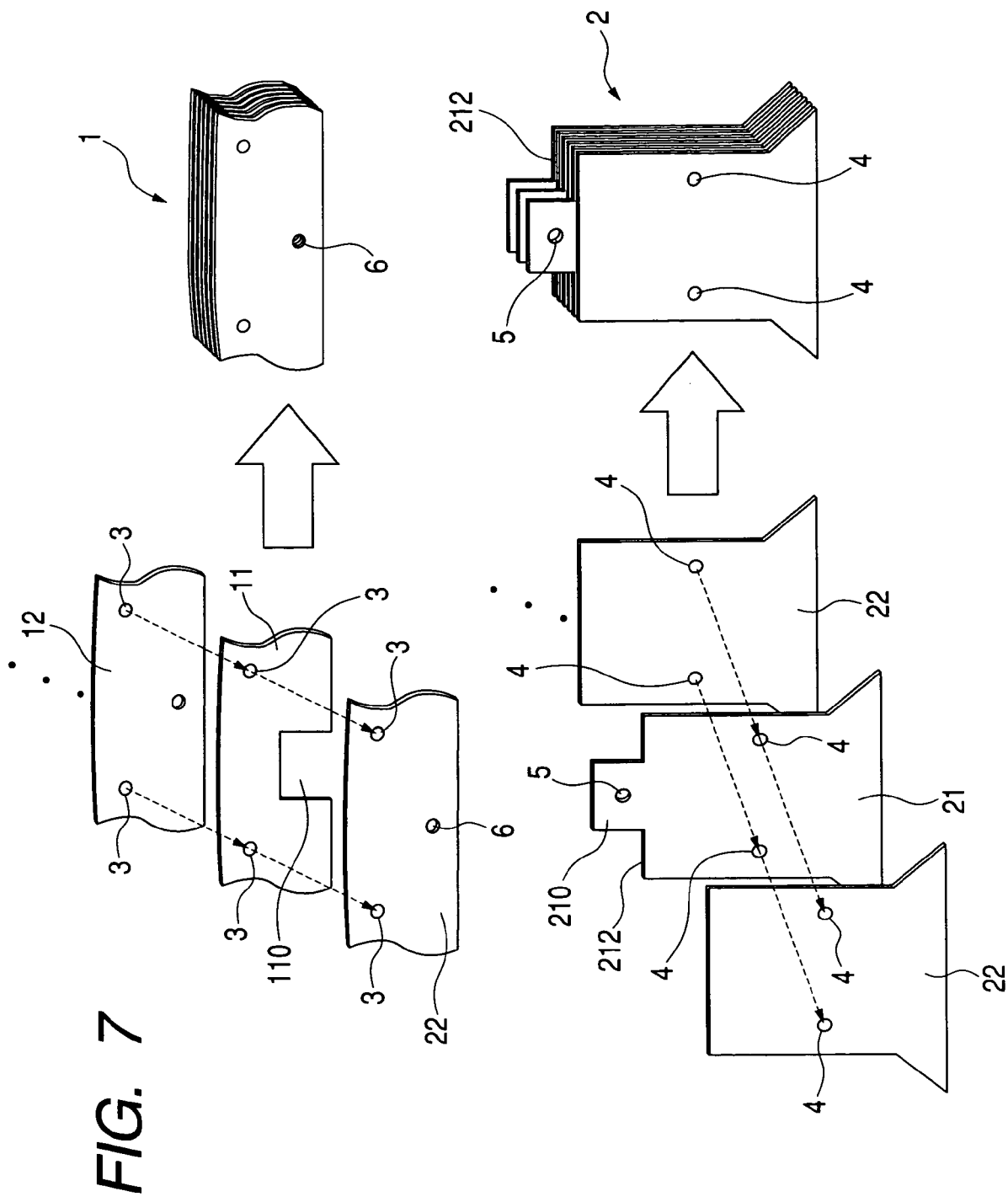
FIG. 7 is a perspective view showing punch-out portions in accordance with the first embodiment of the present invention.

Each of the first annular plates 11 and the second annular plates 12 cooperatively constituting the yoke 1, as shown in FIG. 7, has a pair of punch-out portions 3 being punched out in the lamination direction. The recessed portion 110 is located between the pair of punch-out portions 3 in the circumferential direction. In the assembling work for alternately laminating the first annular plates 11 and the second annular plates 12, the first annular plates 11 and the second annular plates 12 can be easily positioned to right positions by overlapping the punch-out portions 3. Furthermore, it becomes possible to prevent or eliminate the relative displacement between the first annular plates 11 and the second annular plates 12 after these members are once assembled.

Similarly, each of the first teeth 21 and the second teeth 22 cooperatively constituting the teeth block 2, as shown in FIG. 7, has a pair of punch-out portions 4 being punched out in the lamination direction. In the assembling work for alternately laminating the first teeth 21 and the second teeth 22, the first teeth 21 and the second teeth 22 can be easily positioned to right positions by overlapping the punch-out portions 4. Furthermore, it becomes possible to prevent or eliminate the relative displacement between the first teeth 21 and the second teeth 22 after these members are once assembled.

Figure 8:
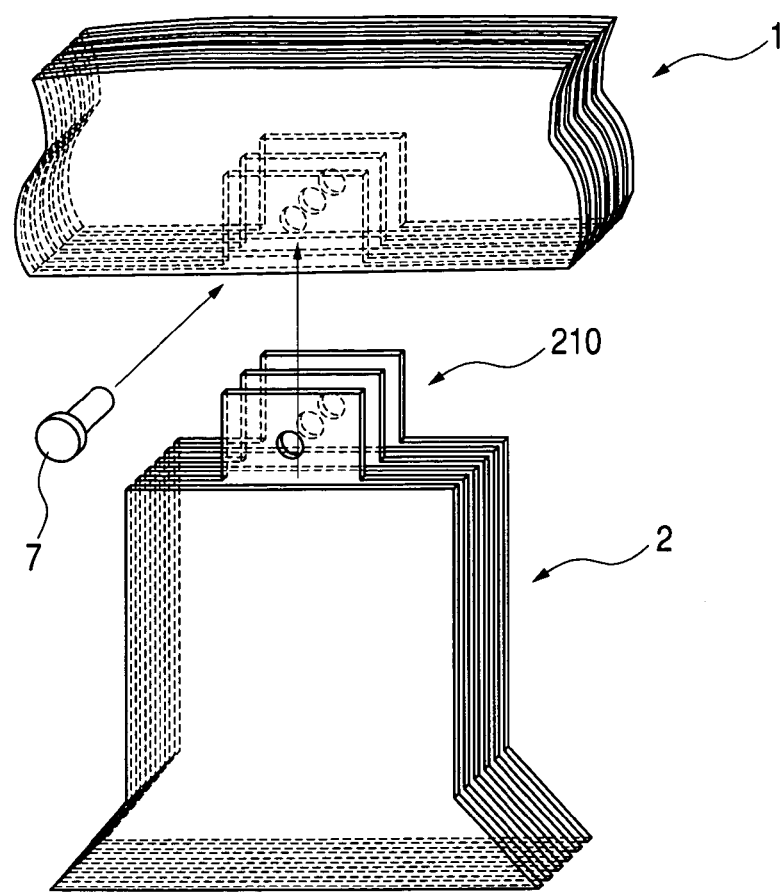
FIG. 8 is a perspective view showing protruding portions and shielding plate portions integrated by a teeth fixing pin in accordance with the first embodiment of the present invention.
Figure 9:
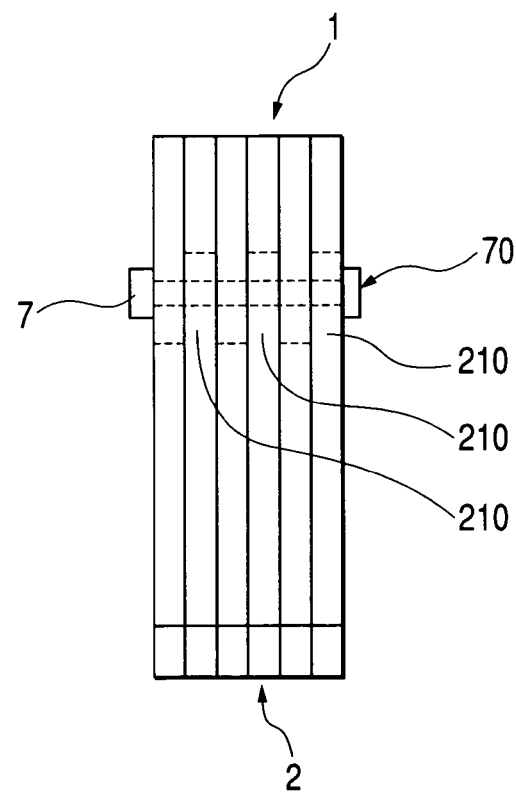
FIG. 9 is a cross-sectional view showing the protruding portions and the shielding plate portions integrated with the teeth fixing pin in accordance with the first embodiment of the present invention.

As shown in FIGS. 5 and 6, the protruding portions 210 of the first teeth 21 have through-holes 5 located at predetermined positions so as to overlap with each other in the lamination direction. The second annular plates 12 have through-holes 6 located at their shielding plate portions so as to overlap with each other in the lamination direction. The protruding portions 210 and the shielding plate portions, as shown in FIGS. 8 and 9, are integrated with a teeth fixing pin 7 being press-fitted into the through-holes 5 and 6. In this case, it is preferable to deform the both ends of the teeth fixing pin 7 after the teeth fixing pin 7 is completely inserted into the through-holes 5 and 6. For example, a pressing force is applied to the both ends of the teeth fixing pin 7 in the lamination direction so as to flatten them. Alternatively, it is preferable that the teeth fixing pin 7 has a large-diameter head and the opposite small-diameter end of the teeth fixing pin 7 is plastically deformed into a flattened portion 70 after the shaft or stem portion of the teeth fixing pin 7 is completely inserted in the through-holes 5 and 6.

Figure 10:
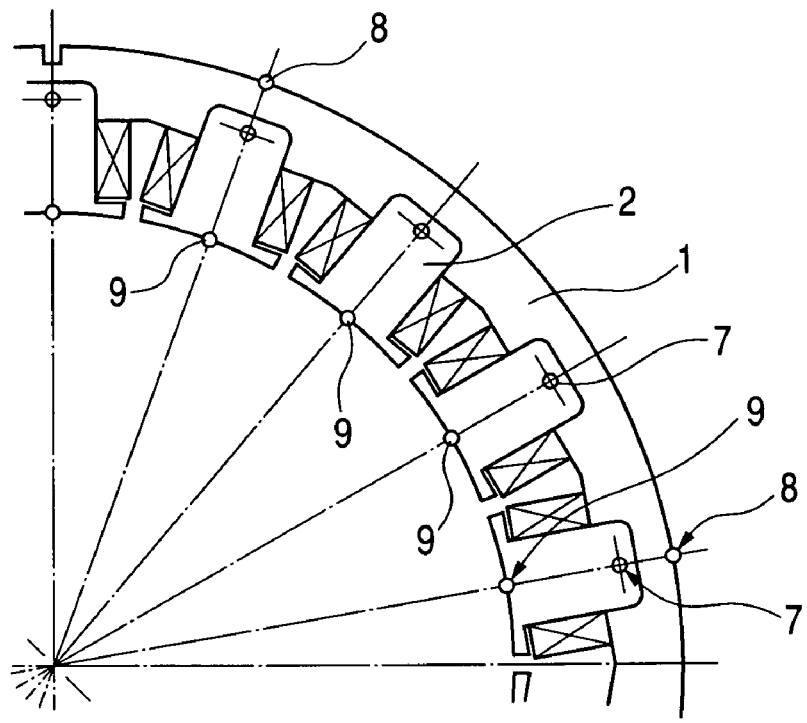
FIG. 10 is a perspective view showing teeth blocks and the yoke in relation to welded portions in accordance with the first embodiment of the present invention.

The electromagnetic steel plates constituting the teeth block 2 or the yoke 1 are welded in the lamination direction to enhance the mechanical strength before or after they are integrated. In FIG. 10, a welded portion 8 is a portion where the electromagnetic steel plates of the yoke 1 are welded together and a welded portion 9 is a portion where the electromagnetic steel plates of the teeth block 2 are welded together. The welded portion 9 is provided on an inside surface of the teeth block 2 facing the rotor. The welded portion 8 is provided on an outer cylindrical surface of the yoke 1. It is preferable that a small groove continuously extending in the lamination direction across the multilayered electromagnetic steel plates is provided on the inside surface of the teeth block 2 and on the outer cylindrical surface of the yoke 1. Each of the welded portions 8 and 9 is formed in the small groove so that the cladding by welding does not protrude from respective surfaces of the teeth block 2 and the yoke 1. According to this embodiment, as shown in FIG. 10, the welded portions 8 and 9 are positioned at the same position as that of the teeth fixing pin 7 in the circumferential direction. The magnetic flux entering into the teeth block 2 from the rotor chiefly flows in the radial direction. Accordingly, positioning the welded portion 9 and the teeth fixing pin 7 to the same position in the circumferential direction makes it possible to reduce the amount of magnetic flux interlinking with the short-circuit path composed of the welded portion 9, the teeth fixing pin 7, and the electromagnetic steel plates. The short-circuit current induced in this short-circuit path can be reduced and accordingly the copper loss can be reduced.

Figure 11:
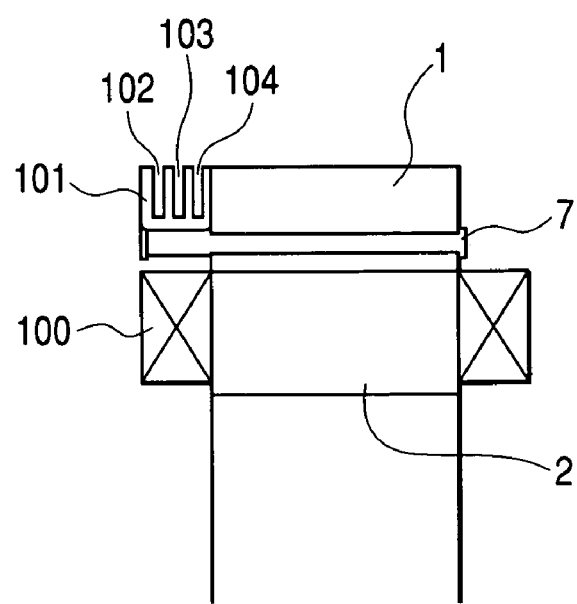
FIG. 11 is a cross-sectional view schematically showing a terminal base in accordance with the first embodiment of the present invention, taken along the axial direction.
Figure 12:
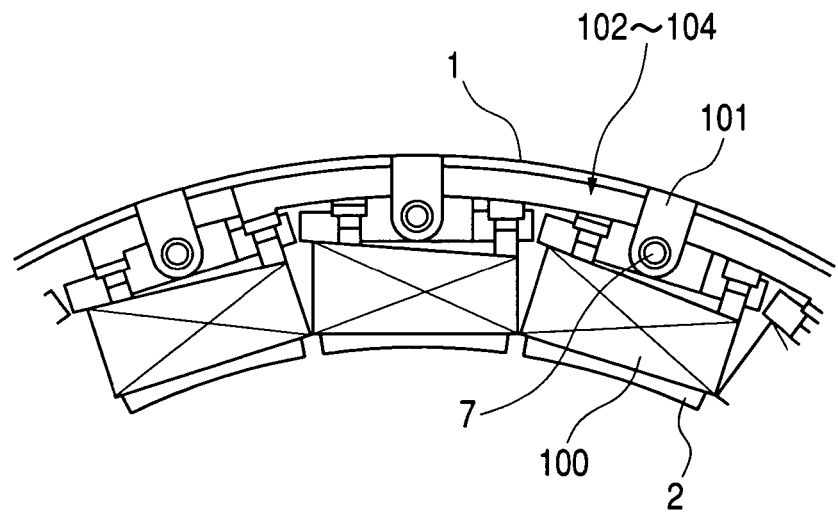
FIG. 12 is a side view showing the terminal base shown in FIG. 11.

According to this embodiment, as shown in FIGS. 11 and 12, both terminals of teeth concentrated winding coil 100 of each teeth block 2 are extended to an electric insulating terminal base 101. The teeth concentrated winding coils 100 of respective teeth blocks 2 are wound in a concentrated manner and are serially connected for each phase so as to constitute a phase winding. The terminal base 101 is fixed on one axial end surface of the yoke 1 by means of the above-described teeth fixing pin 7. The terminal base 101 holds bus bars 102 to 104 for connecting respective teeth concentrated winding coils 100. The above-described terminals of respective teeth concentrated winding coils 100 are connected to the bus bars 102 to 104 so as to serially connect the teeth concentrated winding coils 100 for each phase. It is of course possible to connect respective teeth concentrated winding coils 100 in a serial-parallel pattern for each phase or in a parallel pattern for each phase.

According to the combined stator core of the above-described embodiment, the protruding portions and the second annular plates are alternately laminated and fixed with the teeth fixing pin. Thus, the above-described embodiment of this invention can assure adequate hermetical contact between each teeth block and the yoke which is the advantage of the radial coupling type combined stator core not realized by the axial coupling type combined stator core. Furthermore, the present invention can solve the drawbacks of the above-described conventional radial coupling type combined stator core. More specifically, the present invention makes it possible to prevent each teeth block from falling off the yoke in the radial direction and suppress the chattering vibrations of the teeth block. Thus, the above-described embodiment of this invention realizes a practically excellent combined stator core.

Furthermore, each teeth block has a plurality of protruding portions mutually independent in the lamination direction so as to be separately coupled or fitted into corresponding recessed portions. Thus, compared with the conventional radial coupling type combined stator core, the above-described embodiment of the present invention can provide an improved connection between the teeth block and the yoke. Furthermore, this embodiment can remarkably reduce the magnetic resistance of the stator core.

Second Embodiment

Figure 13:
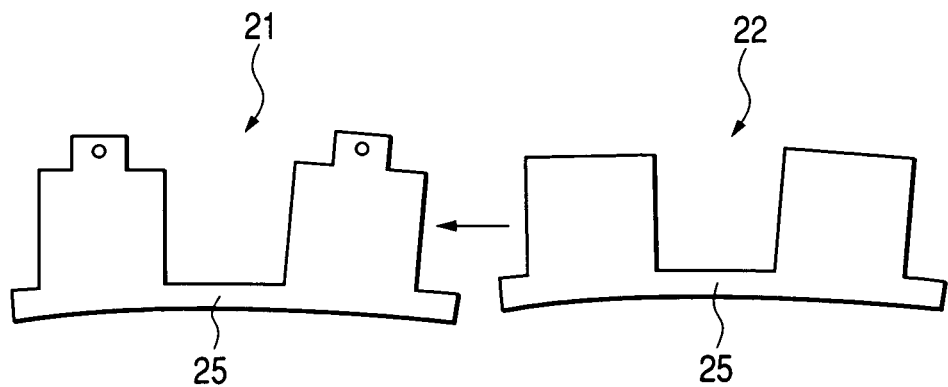
FIG. 13 is an exploded side view schematically showing teeth configurations in accordance with a second embodiment of the present invention.
Figure 14:
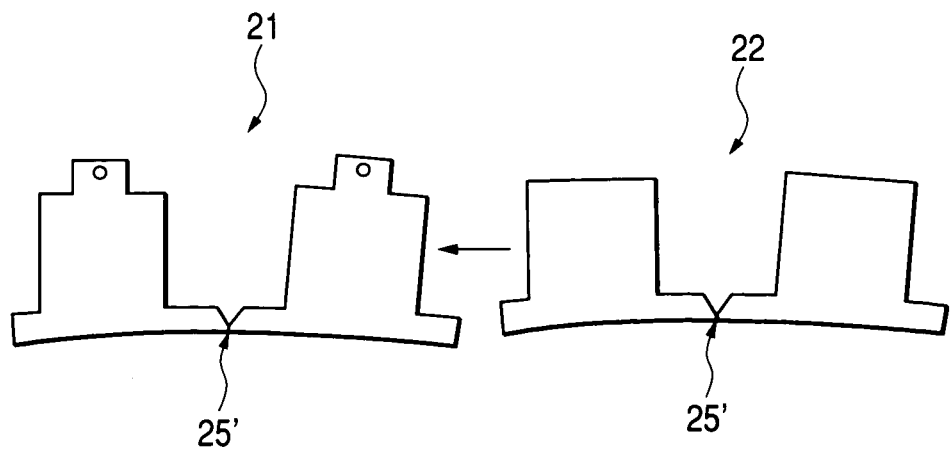
FIG. 14 is an exploded side view schematically showing a modified embodiment of the second embodiment of the present invention.
Figure 15:
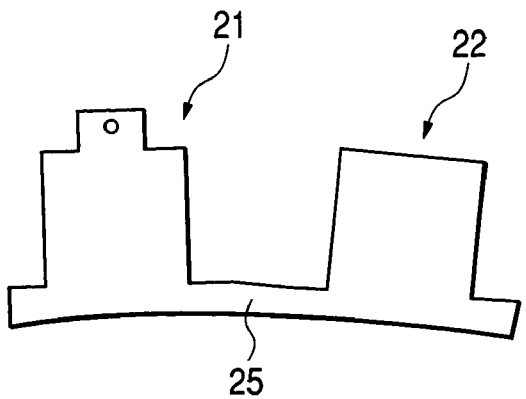
FIG. 15 is an exploded side view schematically showing another modified embodiment of the second embodiment of the present invention.
Figure 16:
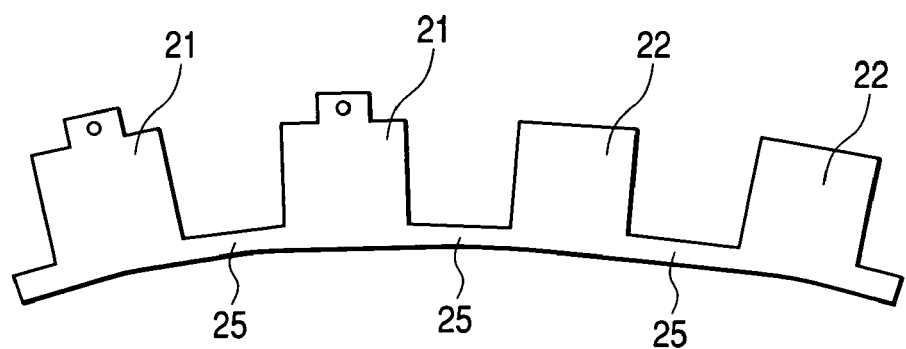
FIG. 16 is an exploded side view schematically showing another modified embodiment of the second embodiment of the present invention.
Figure 17:
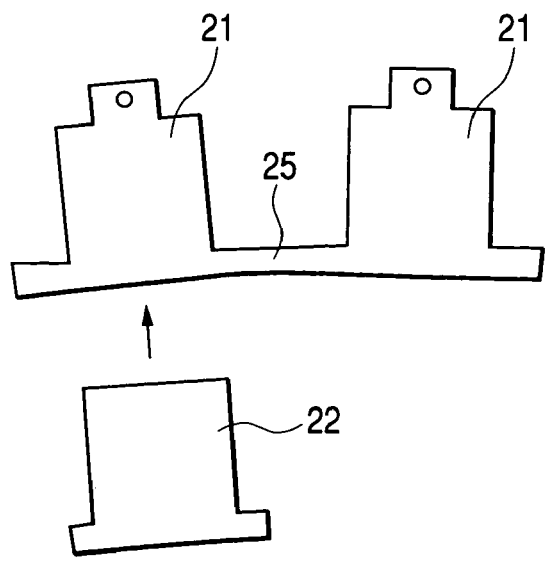
FIG. 17 is an exploded side view schematically showing another modified embodiment of the second embodiment of the present invention.
Figure 18:
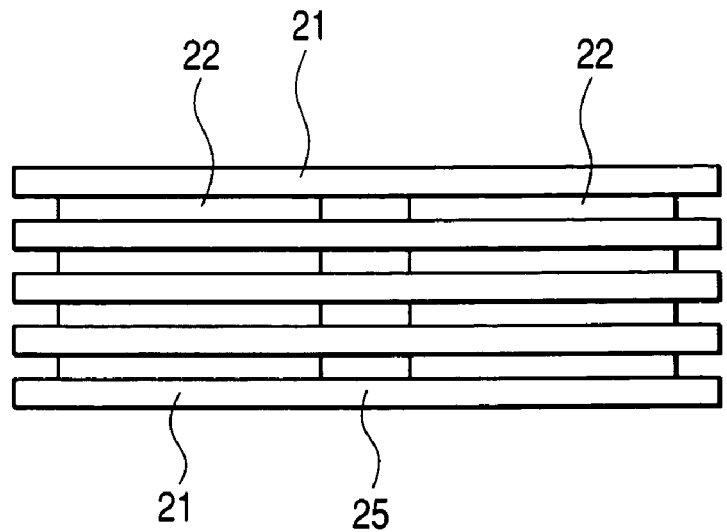
FIG. 18 is a cross-sectional view schematically showing the teeth shown in FIG. 17.

According to the above-described first embodiment, respective teeth blocks 2 are separated from each other. However, as shown in FIG. 13, it is possible to connect two or more same teeth (i.e., first teeth 21 or second teeth 22) with an overhanging flange 25 of the teeth block 2 protruding from the inner radial ends of the teeth block 2 in the circumferential direction so as to narrow the slot. It is preferable that, as shown in FIG. 14, the overhanging flange 25 has a narrowed portion 25' in the center of the circumferential direction where the radial width of the flange 25 is narrowed to reduce the leakage of the magnetic flux. Furthermore, as shown in FIGS. 15 and 16, it is preferable to connect a pair of the first tooth 21 and the second tooth 22 or more. Furthermore, it is preferable as shown in FIGS. 17 and 18 that the combination of a single second tooth 22 and two (or more) consecutive first teeth 21 is used to constitute the teeth block 2. FIG. 18 is a view showing the inner cylindrical surface of the teeth block of FIG. 17. Furthermore, it is possible to form a plurality of teeth blocks 2 including M (M is a plural number) or more second teeth 22 being jointed in the circumferential direction and a plurality of first teeth 21 being larger than M in total number and being jointed in the circumferential direction, wherein these two kinds of jointed teeth groups are combined to constitute respective teeth blocks.

Third Embodiment

Figure 19:
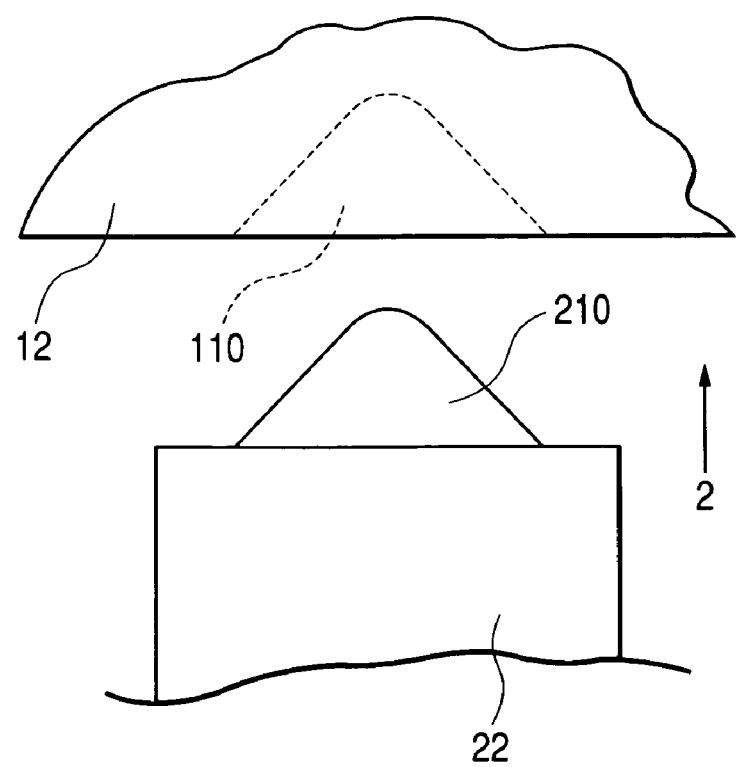
FIG. 19 is a side view schematically showing the teeth coupling arrangement in accordance with a third embodiment of the present invention.

FIG. 19 is a view showing another embodiment of the present invention. According to this embodiment, each of the recessed portion 110 and the protruding portion 210 has a circumferential width decreasing continuously toward the outer radial direction. This arrangement effectively prevents the protruding portion 210 from being obstructed by the sharp edges of the recessed portion 110 when the protruding portion 210 is first inserted into the recessed portion 110. It is also preferable that the second annular plate 12 has a small recessed portion and the first tooth 21 has a small protruding portion being coupled or fitted into the small recessed portion of the second annular plate 12.

Modified Embodiment

The first annular plates 11, the second annular plates 12, the first teeth 21, and the second teeth 22 are constituted by one or a plurality of electromagnetic steel plates.

Fourth Embodiment

Figure 20:
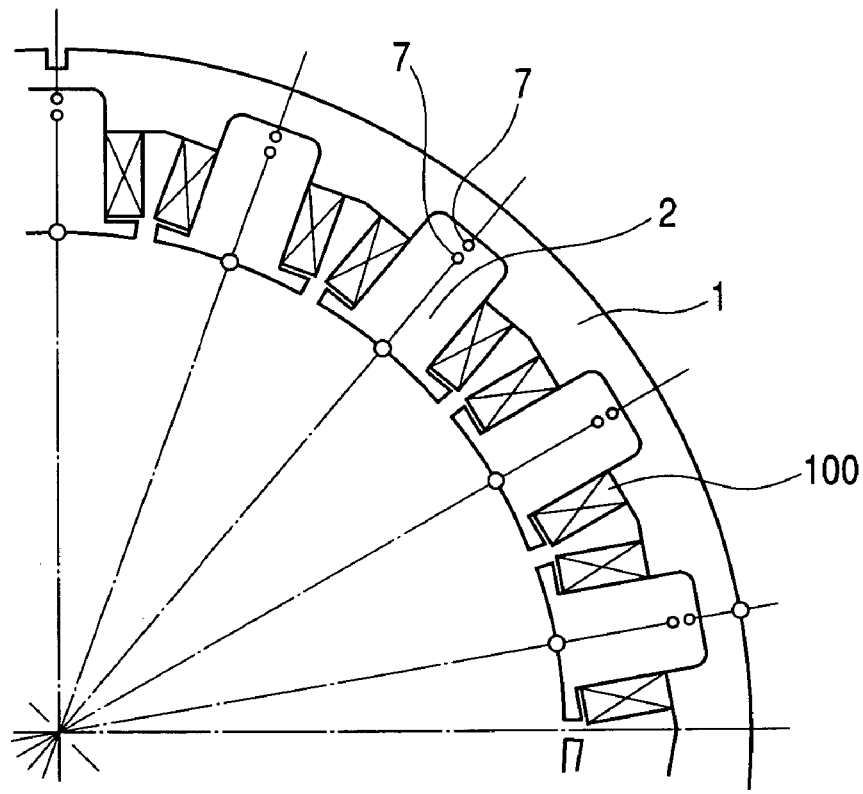
FIG. 20 is a side view schematically showing a yoke and teeth blocks in accordance with a fourth embodiment of the present invention using a plurality of teeth fixing pins, taken along the radial direction.

FIG. 20 is a view showing another embodiment of the present invention. According to this embodiment, two teeth fixing pins 7 are provided so as to be spaced in the radial direction by a predetermined distance and located on the same position in the circumferential direction. With this arrangement, it becomes possible to enhance the mechanical connecting strength of the teeth block 2. Furthermore, it becomes possible to reduce the magnetic excitation force applied on a radial directional cross section of the teeth block 2. The vibration of the teeth block 2 caused by the reaction of the motor torque can be reduced, too. Furthermore, most of the magnetic flux flowing in the teeth block 2 is directed to the radial direction. Thus, locating (or overlapping) a plurality of teeth fixing pins 7 at the same position in the circumferential direction is effective in reducing the current induced in a short-circuit path formed by the plurality of teeth fixing pins 7 and the electromagnetic steel plates.

In this embodiment, it is preferable to provide an electric insulating sheet intervening between the teeth fixing pin 7 and the outermost surface of the yoke 1 (or the teeth block 2) in the lamination direction so that the teeth fixing pin 7 can be brought into contact via this sheet with the outermost surface of the yoke 1 (or the teeth block 2). It is also preferable that one of the teeth fixing pins 7 is constituted by an electric insulating member. Furthermore, it is preferable that an insulating resin film is coated on the surface of the teeth fixing pin 7 so that a bolt can be used as fastening member.

Modified Embodiment

Figure 21:
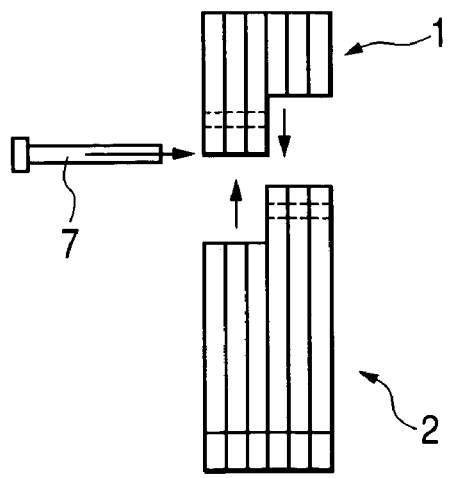
FIG. 21 is a cross-sectional view showing the teeth coupling arrangement in accordance with a modified embodiment of the present invention.
Figure 22:
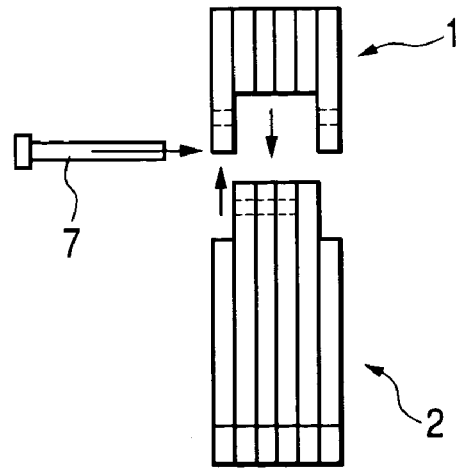
FIG. 22 is a cross-sectional view showing the teeth coupling arrangement in accordance with another modified embodiment of the present invention.
Figure 23:
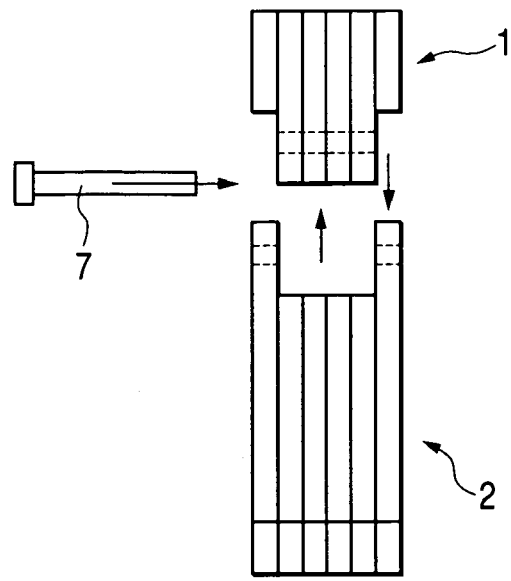
FIG. 23 is a cross-sectional view showing the teeth coupling arrangement in accordance with another modified embodiment of the present invention.

FIGS. 21 and 23 show other modified embodiments of the present invention. As shown in each of FIGS. 21 to 23, the number of the electromagnetic steel plates constituting the first teeth 21 is not always equal to the number of the electromagnetic steel plates constituting the second teeth 22.

Fifth Embodiment

Figure 24:
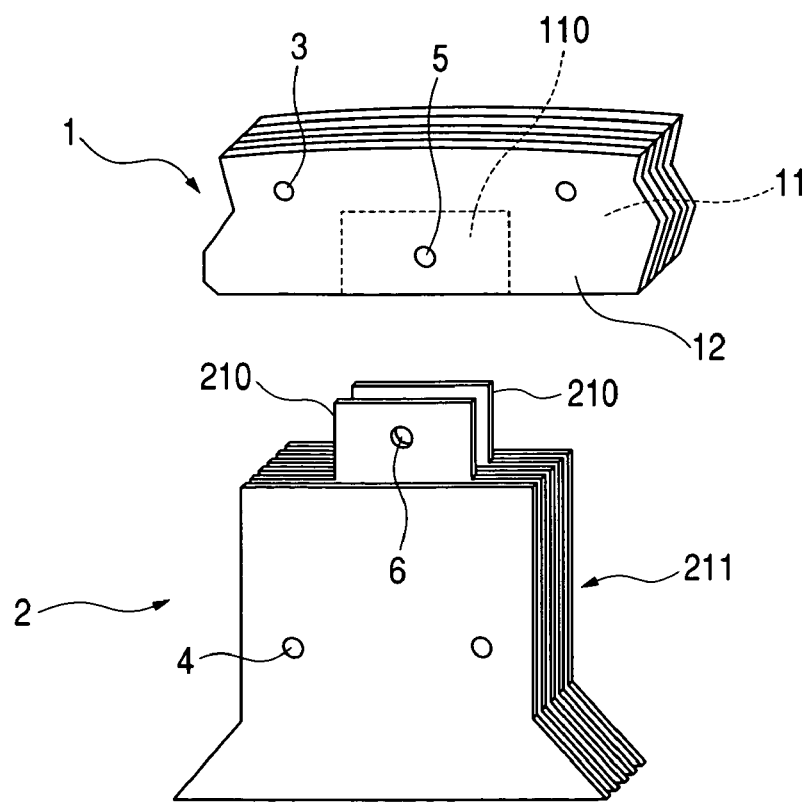
FIG. 24 is a partial perspective view showing a yoke and teeth blocks in accordance with a fifth embodiment of the present invention.

FIG. 24 is a view showing another embodiment of the present invention. A combined stator core according to the fifth embodiment is different from the combined stator core of the first embodiment (shown in FIG. 5) in that the teeth block 2 includes a first tooth 21 with a protruding portion 210 which is constituted by a plurality of multilayered electromagnetic steel plates and a second tooth 22 with no protruding portion which is constituted by a plurality of multilayered electromagnetic steel plates. Similarly, the yoke 1 includes a first annular plate 11 having no recessed portion which is constituted by a plurality of multilayered electromagnetic steel plates and a second annular plate 12 with a recessed portion 110 which is constituted by a plurality of multilayered electromagnetic steel plates.

Furthermore, according to the combined stator core shown in FIG. 24, the teeth block 2 has two protruding portions 210 being overlapped each other with a predetermined interval in the axial direction (i.e., lamination direction). Similarly, the yoke 1 has two recessed portions 110 being overlapped each other with a predetermined interval in the axial direction (i.e., lamination direction).

According to the embodiment shown in FIG. 24, the number of multilayered electromagnetic steel plates constituting the second annular plate 12 having the recessed portion 110 is equal to the number of multilayered electromagnetic steel plates constituting the first tooth 21 having the protruding portion 210. Needless to say, the number of multilayered electromagnetic steel plates constituting the first annular plate 11 having no recessed portion is equal to the number of multilayered electromagnetic steel plates constituting the second tooth 22 having no protruding portion. With this arrangement, it becomes possible to reduce the magnetic resistance.

Modified Embodiment

It is acceptable that the number of multilayered electromagnetic steel plates constituting the second annular plate 12 having the recessed portion 110 is larger by one or more than the number of multilayered electromagnetic steel plates constituting the first tooth 21 having the protruding portion 210. In this case, the number of multilayered electromagnetic steel plates constituting the first annular plate 11 having no recessed portion is correspondingly smaller by one or more than the number of multilayered electromagnetic steel plates constituting the second tooth 22 having no protruding portion. With this arrangement, it becomes possible to slightly reduce the axial direction thickness of the protruding portion 210 compared with that of the recessed portion 110 so that the insertion work for coupling or fitting the protruding portion 210 into the recessed portion 110 can be carried out smoothly.

Modified Embodiment

Figure 25:
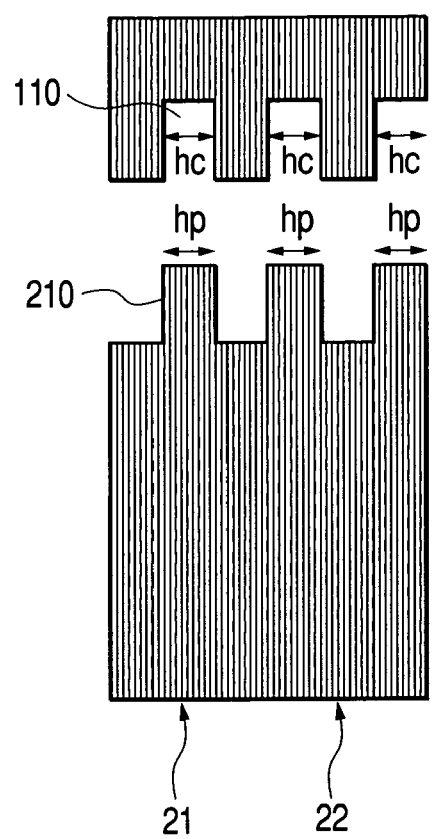
FIG. 25 is a side view showing another combination of the yoke and the teeth block in accordance with a modified embodiment of the present invention.
Figure 26:
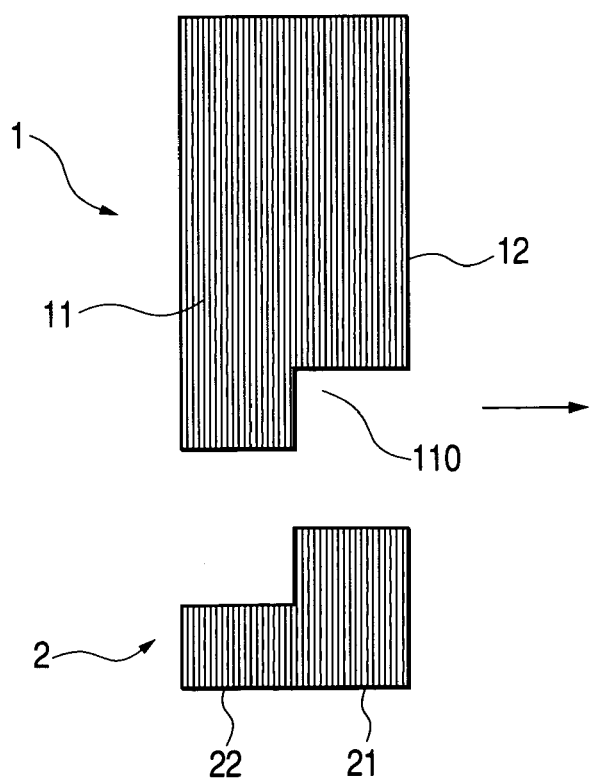
FIG. 26 is a side view showing another combination of the yoke and the teeth block in accordance with a modified embodiment of the present invention.

As shown in FIG. 25, the yoke 1 includes a plurality of recessed portions 110 being overlapped at predetermined intervals in the axial direction, and the teeth block 2 includes a plurality of protruding portions 210 being overlapped at predetermined intervals in the axial direction and being respectively inserted into the recessed portions 110 of the yoke 1. A ratio of a total width of the protruding portions 210 in the axial direction (i.e., in the lamination direction) to a total width of the recessed portions 110 in the axial direction (i.e., in the lamination direction) is in a range from 0.8 to 1.2. Namely, a ratio (3×hp)/(3×hc) is in the range from 0.8 to 1.2, where 'hp' represents an axial width of the electromagnetic steel plate having the protruding portion 210 and 'hc' represents an axial width of the electromagnetic steel plate having the recessed portion 110. The number of the protruding portions 210 being overlapped at predetermined intervals in the axial direction (i.e., in the lamination direction) is not limited to 3. Similarly, the number of the recessed portions 110 being overlapped at predetermined intervals in the axial direction (i.e., in the lamination direction) is not limited to 3. For example, as shown in FIG. 26, it is possible that the teeth block 2 is constituted by a pair of the first tooth 21 and the second tooth 22 and the yoke 1 is constituted by a pair of the first annular plate 11 and the second annular plate 12.

Modified Embodiment

In the embodiment shown in FIG. 25, the axial widths (i.e., hc) of respective recessed portions 110 being disposed at predetermined intervals are not always equal to each other. The axial widths (i.e., hp) of respective protruding portions 210 being disposed at predetermined intervals are not always equal to each other.

Sixth Embodiment

Figure 27:
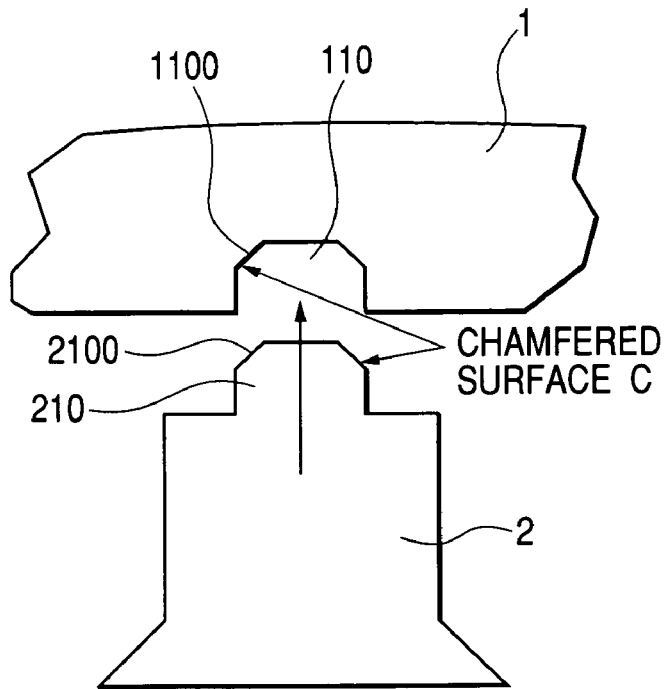
FIG. 27 is a side view showing a yoke and a teeth block in accordance with a sixth embodiment of the present invention.
Figure 28:
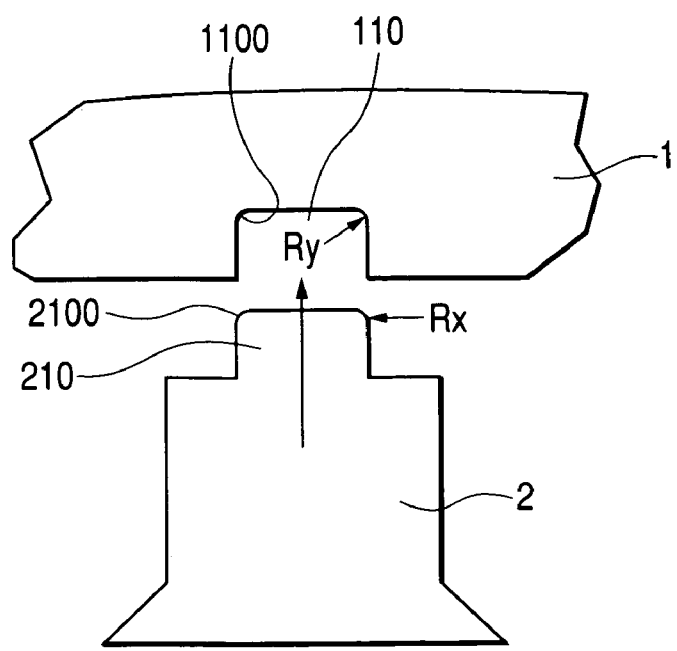
FIG. 28 is a side view showing another combination of the yoke and the teeth block in accordance with a modified embodiment of the present invention.

FIGS. 27 and 28 are views cooperatively showing another embodiment of the present invention. According to this embodiment, the protruding portion 210 is configured into a rectangular shape when seen from the axial direction. The protruding portion 210 has a convex corner 2100 with a chamfered surface C. The recessed portion 110 is configured into a rectangular shape when seen from the axial direction. The recessed portion 110 has a concave corner 1100 with a chamfered surface C. This arrangement effectively prevents the protruding portion 210 from being obstructed by the sharp edges of the recessed portion 110 when the protruding portion 210 is first inserted into the recessed portion 110. Furthermore, the convex corner 2100 of the protruding portion 210 is just fitted to the concave corner 1100 of the recessed portion 110. Thus, it becomes possible to prevent the magnetic resistance from increasing.

As shown in FIG. 28, a ratio Rx/Ry is set in a range from 1.0 to 1.5, where Rx represents a curvature radius of the convex corner 2100 of the protruding portion 210 and Ry represents a curvature radius of the concave corner 1100 of the recessed portion 110. As the difference between the above two curvature radii is small, it becomes possible to reduce the substantial gap between the convex corner 2100 and the concave corner 1100. Thus, the magnetic resistance becomes small.

What is claimed is:

1. A combination type stator core applicable to an electric rotary machine, comprising:
   a plurality of electromagnetic steel plates being multilayered so as to have a cylindrical yoke with numerous recessed portions arranged at predetermined pitches in a circumferential direction and each opened toward an inner radial direction and a teeth block extending toward the inner radial direction with protruding portions coupled or fitted into said recessed portions of said yoke, wherein
   one or more teeth fixing pins are provided to fix said teeth block to said yoke;
   said yoke comprises first annular plates defining said recessed portions being opened toward both axial directions as well as toward the inner radial direction and second annular plates being disposed next to said first annular plates at an axial end thereof and each having a shielding plate portion for shielding said recessed portions of said first annular plates in a lamination direction of said multilayered electromagnetic steel plates;

said teeth block comprises first teeth defining said protruding portions inserted in the radial direction and fitted into said recessed portions and second teeth each being disposed next to said first teeth in the axial direction so as to be brought into hermetical contact with a cylindrical surface of said second annular plates;

said one or more teeth fixing pins are inserted in through-holes of said shielding plate portions of said second annular plates and in through-holes of said protruding portions of said second teeth which are overlapped with each other in the lamination direction, and each of said protruding portions is arranged by a plurality of electromagnetic steel plates being multilayered to form said first teeth of said teeth block, and each of said recessed portions is arranged by a plurality of electromagnetic steel plates being multilayered to form said first annular plates of said yoke.

2. The combination type stator core applicable to an electric rotary machine in accordance with claim 1, wherein said recessed portions and said protruding portions being fitted into said recessed portions are provided as a plurality of pairs and disposed in such a manner that said recessed portions are independent from each other in the lamination direction and also said protruding portions are independent from each other in the lamination direction.

3. The combination type stator core applicable to an electric rotary machine in accordance with claim 2, wherein a circumferential width of a radial end portion of said protruding portion is 98% or more of a circumferential width of a radial opening portion of said recessed portion.

4. The combination type stator core applicable to an electric rotary machine in accordance with claim 3, wherein the circumferential width of said protruding portion continuously increases with increasing distance from said radial end portion toward the inner radial direction, and the circumferential width of said recessed portion continuously decreases with increasing distance from said radial opening portion toward an outer radial direction.

5. The combination type stator core applicable to an electric rotary machine in accordance with claim 2, wherein an end portion of said teeth fixing pin is flattened by plastic deformation after said teeth fixing pin is inserted into said through-holes.

6. The combination type stator core applicable to an electric rotary machine in accordance with claim 2, wherein said first annular plates and said second annular plates are welded together, and said first teeth and said second teeth are welded together.

7. The combination type stator core applicable to an electric rotary machine in accordance with claim 6, wherein the welded portion of said first teeth and said second teeth is offset from said teeth fixing pin by a predetermined distance in the radial direction and is located at the same position in the circumferential direction.

8. The combination type stator core applicable to an electric rotary machine in accordance with claim 2, wherein said first annular plates, said second annular plates, said first teeth, and said second teeth are constituted by a plurality of electromagnetic steel plates being multilayered.

9. The combination type stator core applicable to an electric rotary machine in accordance with claim 1, wherein punch-out portions extending in the lamination direction and continuous with each other are formed in said first annular plates and said second annular plates or in said first teeth and said second teeth.

10. The combination type stator core applicable to an electric rotary machine in accordance with claim 1, wherein a terminal base for processing a coil end is fixed to one end surface of said yoke by means of said teeth fixing pin.

11. The combination type stator core applicable to an electric rotary machine in accordance with claim 1, wherein said teeth fixing pin is a plurality of pins spaced in the radial direction by a predetermined distance and located at the same position in the circumferential direction.

12. The combination type stator core applicable to an electric rotary machine in accordance with claim 1, wherein a first tooth or a second tooth is connected to other first tooth or other second tooth neighboring in the circumferential direction via an overhanging flange which extends from an inner end of said first tooth or said second tooth so as to close a slot.

13. The combination type stator core applicable to an electric rotary machine in accordance with claim 1, wherein said yoke includes a plurality of recessed portions being overlapped at predetermined intervals in the axial direction, said teeth block includes a plurality of protruding portions being overlapped at predetermined intervals in the axial direction and being respectively inserted into said recessed portions of said yoke, and a ratio of a total width of said protruding portions in the axial direction to a width of said recessed portions in the axial direction is in a range from 0.8 to 1.2.

14. The combination type stator core applicable to an electric rotary machine in accordance with claim 1, wherein
said recessed portion and said protruding portion being inserted into said recessed portion are configured into rectangular shape when seen from the axial direction,
a convex corner of said protruding portion and a concave corner of said recessed portion being fitted to each other are chamfered, and
a ratio Rx/Ry is in a range from 1.0 to 1.5, where Rx represents a curvature radius of said convex corner of said protruding portion and Ry represents a curvature radius of said concave corner of said recessed portion.

15. A combination type stator core applicable to an electric rotary machine, comprising:
a plurality of electromagnetic steel plates being multilayered so as to have a cylindrical yoke with numerous recessed portions arranged at predetermined pitches in the circumferential direction and each opened toward an inner radial direction and a teeth block extending toward the inner radial direction with protruding portions coupled or fitted into said recessed portions of said yoke, wherein
said yoke comprises first annular plates defining said recessed portions being opened toward both axial directions as well as toward the inner radial direction and second annular plates being disposed next to said first annular plates at an axial end thereof and each having a shielding plate portion for shielding said recessed portions of said first annular plates in a lamination direction of said multilayered electromagnetic steel plates;
said teeth block comprises first teeth defining said protruding portions inserted in the radial direction and fitted into said recessed portions and second teeth each being disposed next to said first teeth in the axial direction so as to be brought into hermetical contact with a cylindrical surface of said second annular plates;

said recessed portions and said protruding portions being fitted into said recessed portions are provided as a plurality of pairs and disposed in such a manner that said recessed portions are independent from each other in the lamination direction and also said protruding portions are independent from each other in the lamination direction, and each of said protruding portions is arranged by a plurality of electromagnetic steel plates being multilayered of form said first teeth of said teeth block, and each of said recessed portions is arranged by a plurality of electromagnetic steel plates being multilayered to form said first annular plates of said yoke.

16. The combination type stator core applicable to an electric rotary machine in accordance with claim 15, wherein punch-out portions extending in the lamination direction and continuous with each other are formed in said first annular plates and said second annular plates or in said first teeth and said second teeth.

17. The combination type stator core applicable to an electric rotary machine in accordance with claim 15, wherein a terminal base for processing a coil end is fixed to one end surface of said yoke by means of a teeth fixing pin.

18. The combination type stator core applicable to an electric rotary machine in accordance with claim 15, wherein a first tooth or a second tooth is connected to other first tooth or other second tooth neighboring in the circumferential direction via an overhanging flange which extends from an inner end of said first tooth or said second tooth so as to close a slot.

19. The combination type stator core applicable to an electric rotary machine in accordance with claim 15, wherein said yoke includes a plurality of recessed portions being overlapped at predetermined intervals in the axial direction, said teeth block includes a plurality of protruding portions being overlapped at predetermined intervals in the axial direction and being respectively inserted into said recessed portions of said yoke, and a ratio of a total width of said protruding portions in the axial direction to a total width of said recessed portions in the axial direction is in a range from 0.8 to 1.2.

20. The combination type stator core applicable to an electric rotary machine in accordance with claim 15, wherein said recessed portion and said protruding portion being inserted into said recessed portion are configured into rectangular shape when seen from the axial direction, a convex corner of said protruding portion and a concave corner of said recessed portion being fitted to each other are chamfered, and a ratio $R_x/R_y$ is in a range from 1.0 to 1.5, where $R_x$ represents a curvature radius of said convex corner of said protruding portion and $R_y$ represents a curvature radius of said concave corner of said recessed portion.

* * * * *